United States Patent [19]

Sekizawa et al.

[11] Patent Number: 4,510,866
[45] Date of Patent: Apr. 16, 1985

[54] APPARATUS FOR MEASURING THE AREA OF IMAGE PORTION OF IMAGE-BEARING MEMBER

[75] Inventors: Hidekazu Sekizawa, Yokohama; Akito Iwamoto, Kamakura; Kousaku Togashi, Yokohama; Hideo Fujie, Shizuoka, all of Japan

[73] Assignees: Tokyo Shibaura Denki Kabushiki Kaisha, Tokyo; Toshiba Machine Co., Ltd., Kawasaki, both of Japan

[21] Appl. No.: 449,201

[22] Filed: Dec. 13, 1982

[30] Foreign Application Priority Data

Dec. 17, 1981 [JP] Japan ............................... 56-202421

[51] Int. Cl.³ ............................................. B41F 31/04
[52] U.S. Cl. ..................................... 101/365; 358/206
[58] Field of Search ............... 101/365, 350, DIG. 25, 101/DIG. 26, 181, 183; 356/444, 379, 380, 429; 250/559, 230, 234, 235; 358/199, 205, 206, 285, 292

[56] References Cited

U.S. PATENT DOCUMENTS

| | | | |
|---|---|---|---|
| 3,185,088 | 5/1965 | Norton | 101/426 |
| 3,448,458 | 6/1969 | Carlson et al. | 358/206 |
| 3,646,568 | 2/1972 | Woywood | 358/206 X |
| 3,841,215 | 10/1974 | Hasegawa | 101/350 |
| 3,958,509 | 5/1976 | Murray et al. | 250/559 |
| 4,010,364 | 3/1977 | Fuwa | 250/234 |
| 4,024,341 | 5/1977 | Takahashi | 358/206 |

Primary Examiner—J. Reed Fisher
Attorney, Agent, or Firm—Oblon, Fisher, Spivak, McClelland & Maier

[57] ABSTRACT

In an apparatus which measures an area factor of an image portion of an image-bearing member, such as a printing plate used in an offset press, having image and non-image portions with different reflectivities, a single light source and a single photoelectric conversion element are used for measuring reflected light from the image-bearing member by optically scanning the image-bearing member. An arithmetic operation unit is provided so that the reflected light data are measured on the basis of electrical signals from the photoelectric conversion element each time a light beam moves for a unit distance in the X axis direction of the image-bearing member, and the corresponding reflected light data are added in the Y axis direction to obtain area data for each unit region in the X axis direction. In the offset press, an area factor of an image portion for each ink control zone of the press is calculated on the basis of the area data for the respective unit regions and the quantity of ink for each ink control zone is thus controlled.

5 Claims, 28 Drawing Figures

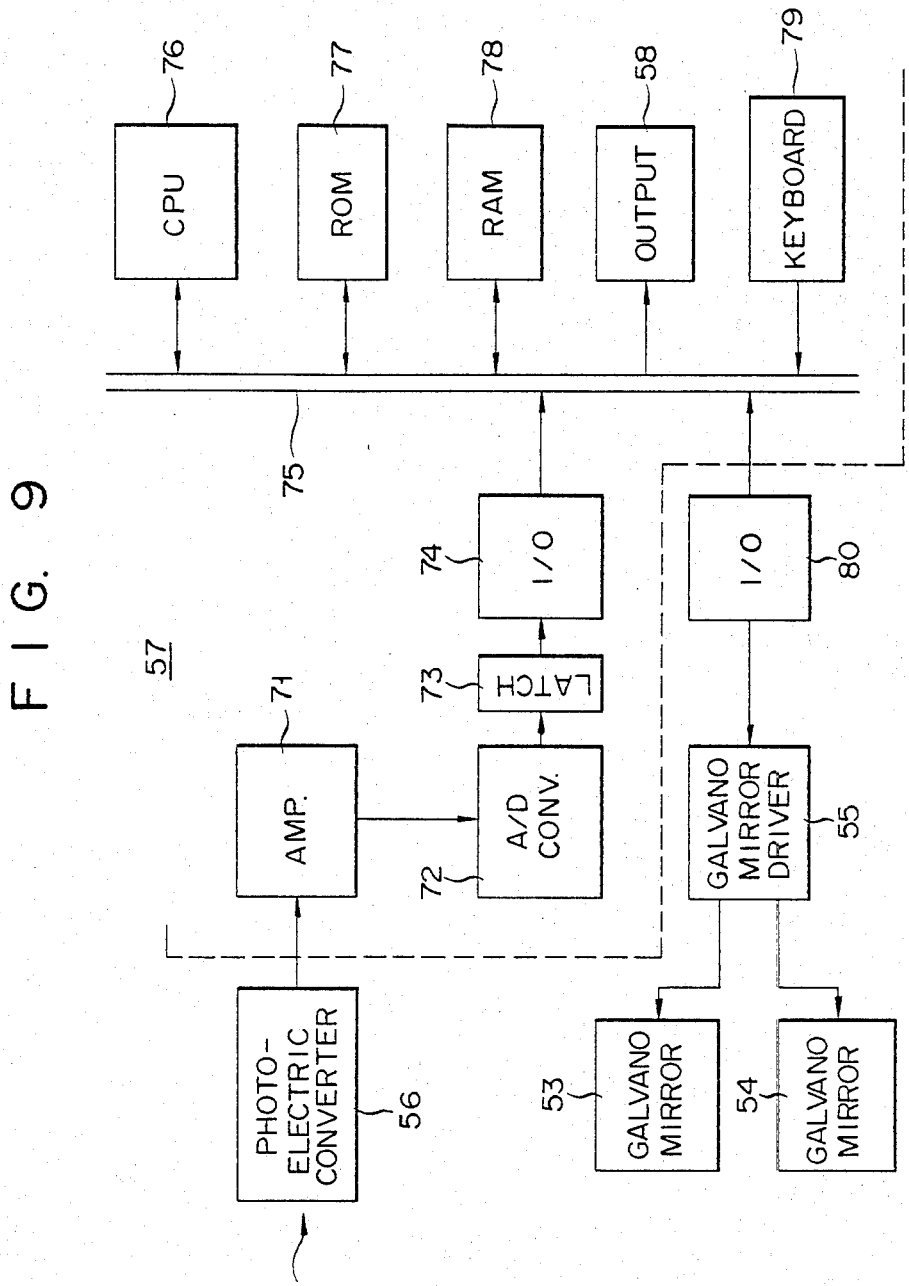
F I G. 9

F I G. 23
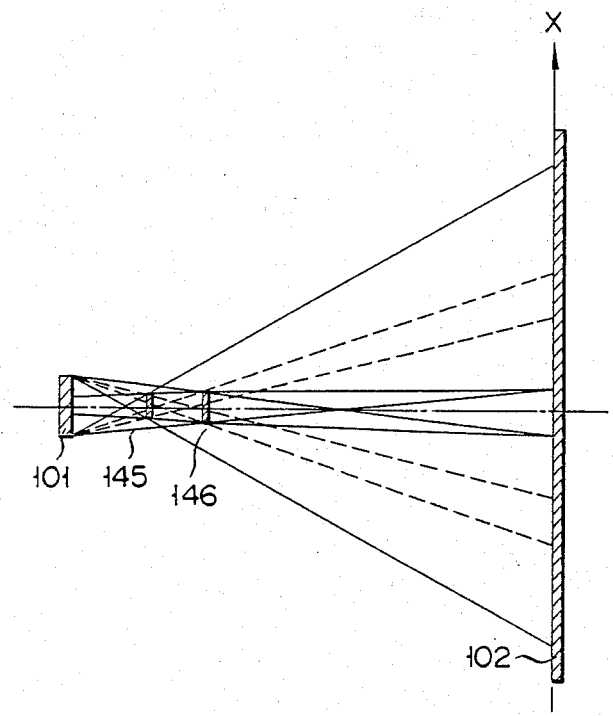
F I G. 24
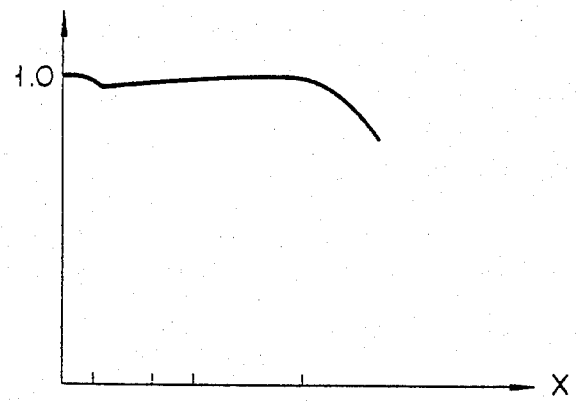

FIG. 25A     FIG. 25B
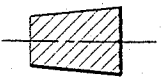 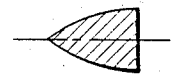
FIG. 26
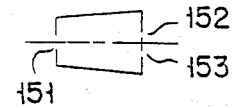
FIG. 27
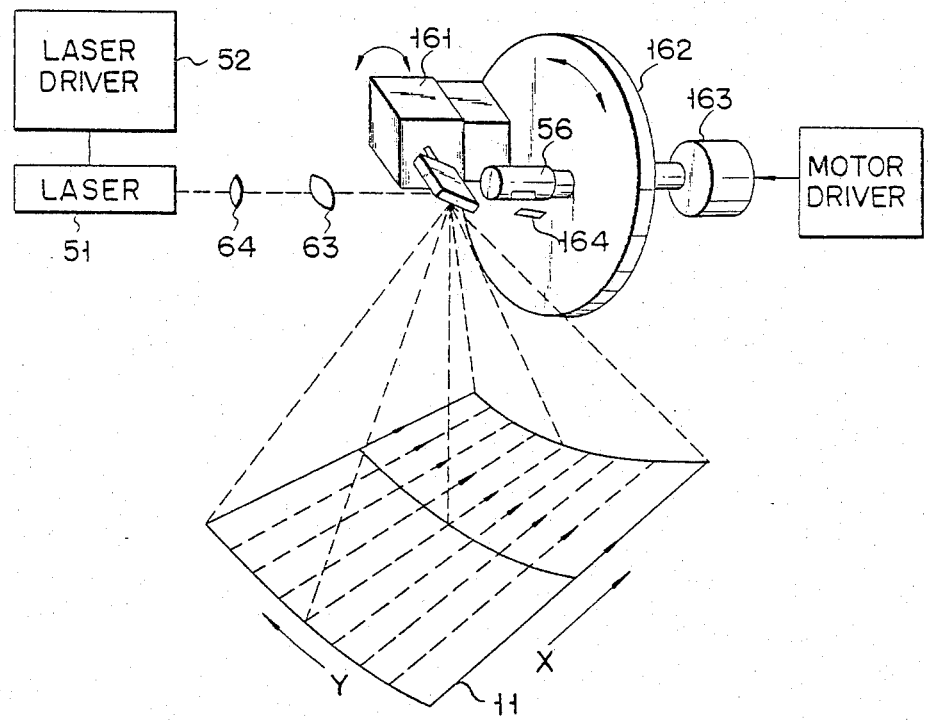

APPARATUS FOR MEASURING THE AREA OF IMAGE PORTION OF IMAGE-BEARING MEMBER

BACKGROUND OF THE INVENTION

The present invention relates to an apparatus for measuring the area or area factor of an image portion of an image-bearing member having image and non-image portions with different reflectivities.

As an example of such an apparatus for measuring the image area, there is an apparatus for measuring the area of that portion of a printing plate used in an offset press which is inked, that is, the area of the image portion. The purpose of measuring the area of the image portion of the printing plate is to cause an ink supply device to supply a quantity of ink corresponding to the area of the image portion, thereby making proper printing possible.

In an apparatus for measuring the area of an image portion of a printing plate as disclosed in Japanese Patent Early Publication No. 56-54310, a large number of photoelectric conversion elements are disposed in a line on a movable stage and a pair of fluorescent lamps are disposed on the movable stage with the photoelectric conversion elements interposed therebetween. A printing plate is placed below the stage. As the stage moves over the printing plate, the printing plate is optically scanned. The image area is measured on the basis of outputs of the photoelectric conversion elements responsive to reflected light from the printing plate.

The size of printing plates used in the offset printing is normally about 1.2 m × 1.4 m. Accordingly, the size of the image area measuring apparatus must also match this size. In order to accurately measure the image area of image-bearing member of a fairly large area, it is necessary to uniformly illuminate the whole area of a region to be measured and to uniformly receive the reflected light from the whole area of the region.

In the above-described conventional apparatus linear fluorescent lamps are used as a light source. Therefore, it is difficult to maintain a stable and uniform illumination for a long period of time. And moreover, because a large number of photoelectric conversion elements are used, the uniform reception of reflected light is difficult due to non-uniformity in sensitivity of the conversion elements. At the time of area measurement, since the large-sized stage is moved, it is difficult to measure at high speed.

SUMMARY OF THE INVENTION

An object of the present invention is to provide an apparatus for measuring image areas which has a high speed of measurement, is easy to adjust and low in cost.

In an image area measuring apparatus according to the present invention, in order to obtain data for calculating the area of an image portion by optically scanning an image-bearing member having image and non-image portions with different reflectivities, a single light source and a single photoelectric conversion element are used. A light beam from the light source is deflected by scanning means in the X axis direction and the Y axis direction of the image-bearing member. An arithmetic operation unit is provided which calculates area data for each of unit regions in the X axis direction of the image-bearing member by measuring reflected light data each time the light beam moves for a unit distance along the X axis direction of the image-bearing member and adding together the corresponding reflected light data of the same X axis position.

According to the present invention, since a single light source and a single photoelectric conversion element are employed, the construction is simple and adjustment is easy. The optical scanning of image-bearing member by a light beam can be done in a short time so that measurement can also be performed quickly.

The apparatus of the present invention is suitable for measuring the area factor of an image portion of such a printing plate as used in an offset printing press. The offset printing press has a plurality of ink control devices for controlling the quantity of ink supplied to each of the ink control zones of the printing plate in accordance with the area factor of the image portion of each of the ink control zones. The width of ink control zones of the printing plate, which is determined by the ink supply control devices, differs with each type of offset printing press. Therefore, when the image area data for each unit region of the printing plate is measured, the image area factor of the respective ink control zones of the printing plate can be easily obtained at the printing press into which the printing plate is loaded.

BRIEF DESCRIPTION OF THE DRAWINGS

FIG. 9 is a block diagram of an arithmetic operation unit in FIG. 5;

FIGS. 21 to 23 show other modifications of douser;

FIG. 24 shows a distribution of received light at a light receiving element obtained when the douser in FIG. 23 is used;

FIG. 25 A and B and FIG. 26 show three-dimensional dousers;

FIG. 27 is a data measuring device for obtaining uniform distribution of received light in the X axis direction and the Y axis direction of a printing plate.

DETAILED DESCRIPTION OF THE PREFERRED EMBODIMENT

Hereinafter, an embodiment of the present invention will be described which is directed to measure the area of image portion of a printing plate of an offset printing press.

Figure 1:
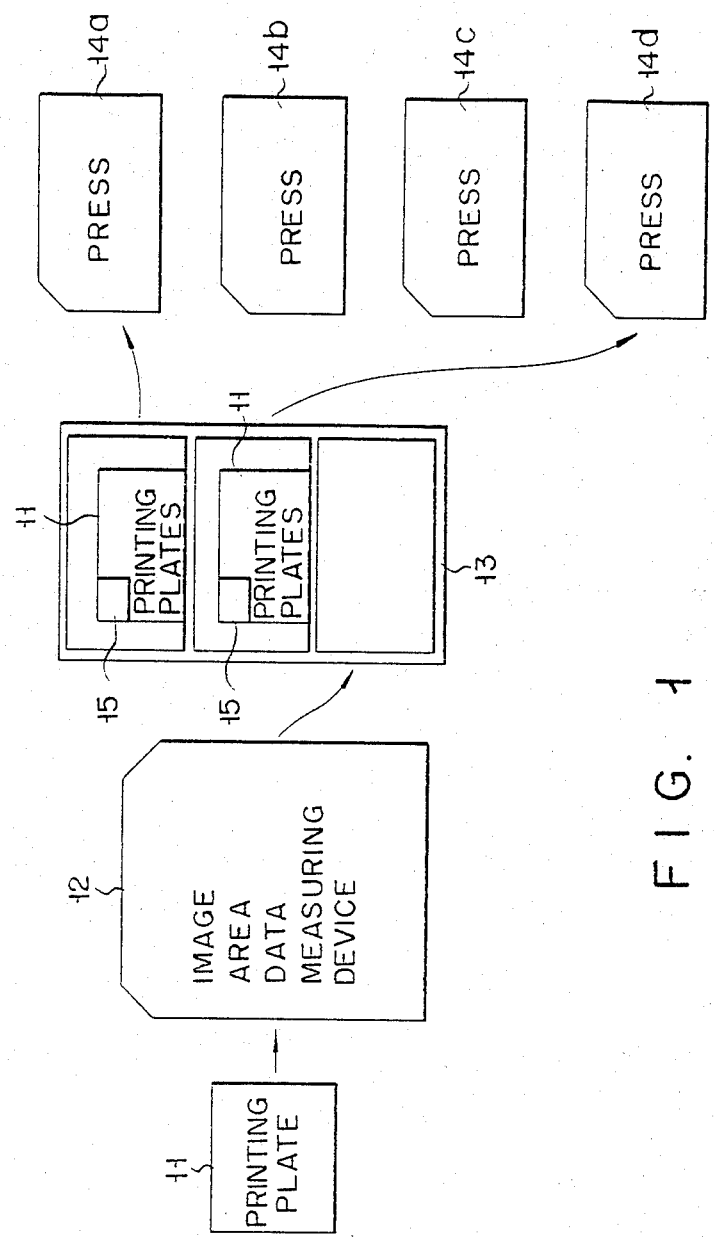
FIG. 1 shows an offset printing machine system having an apparatus for measuring image area according to the present invention.

FIG. 1 illustrates an offset press system using the method and apparatus for measuring the area of image portion according to the present invention. The system has an area data measuring device 12 for optically measuring basic data for obtaining the area or area factor of image portion of each of a plurality of ink control zones of a printing plate 11, a container device 13 for temporarily storing printing plates 11 the area data of which were measured, and a plurality of presses 14a, 14b, . . . into which each printing plate is loaded for printing. In the system, the data measured in area data measuring device 12 are recorded on a magnetic card 15 and the magnetic card is attached to the corresponding printing plate 11. Magnetic card 15 is read in a press into which a printing plate with this magnetic card is loaded to calculate the area or area factor of image portion of each of the ink control zones of the printing plate. A plurality of ink supply control devices, which define a plurality of ink control zones, each supply the quantity of ink corresponding to the area of image portion of the corresponding ink control zone. The calculation of image areas of the ink control zones of a printing plate is effected in a press because the width of ink control zones or the interval between ink quantity adjusting screws or keys of presses differs with the types of presses.

Figure 2:
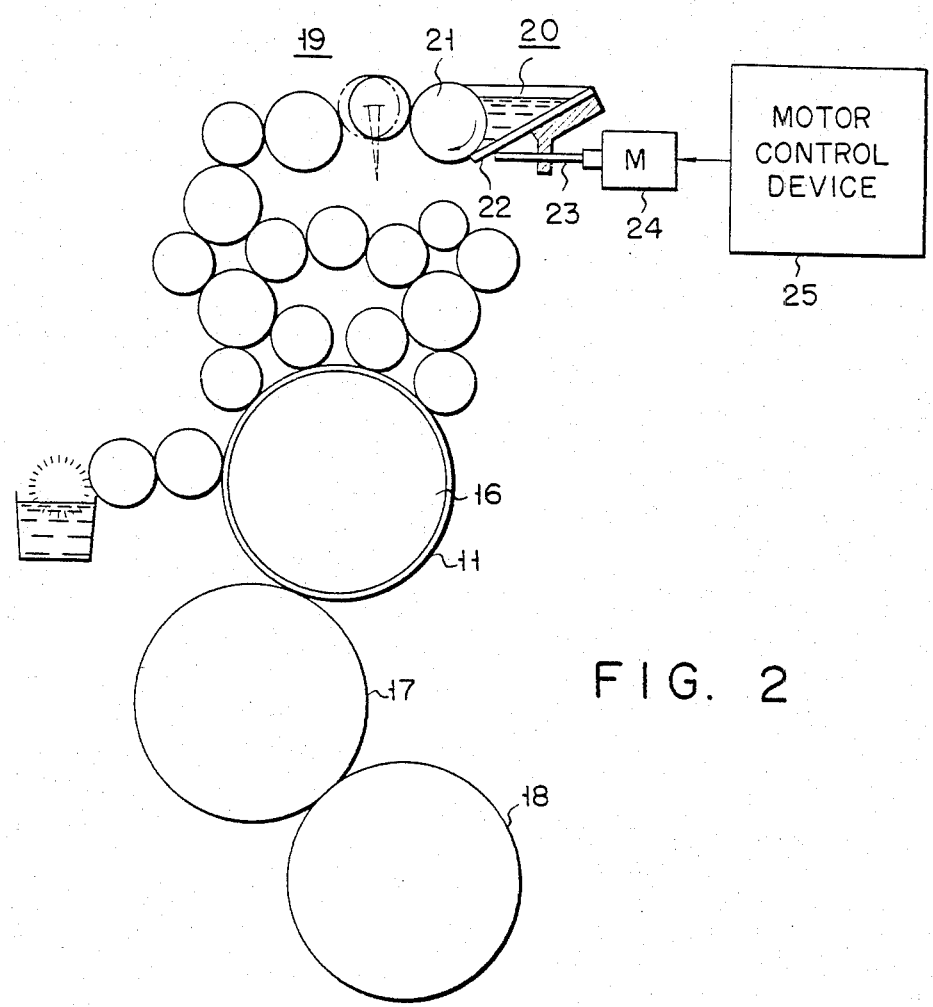
FIG. 2 schematically illustrates an offset printing press.

FIG. 2 schematically illustrates an offset press. The offset press comprises a plate cylinder 16 about which a printing plate 11 is wound, a blanket cylinder 17, an impression roller 18 and an inking arrangement 19. Inking arrangement 19 has an ink fountain 20. Within ink fountain 20 a duct roller 21 whose rotational speed is controllable is rotated, thereby transferring ink from ink fountain 20 to plate cylinder 16 through various rollers. The quantity of ink supplied to plate cylinder 16 is controlled by adjusting the gap between duct roller 21 and a fountain blade 22 which moves toward or away from duct roller 21. The gap is adjusted by an ink key or screw 23 which engages the lower part of blade 22. Forward or backward movement of ink key 23, that is, control in the quantity of ink supply, is made by a stepper motor 24 which is controlled by a motor control device 25 to be described later.

Figure 3:
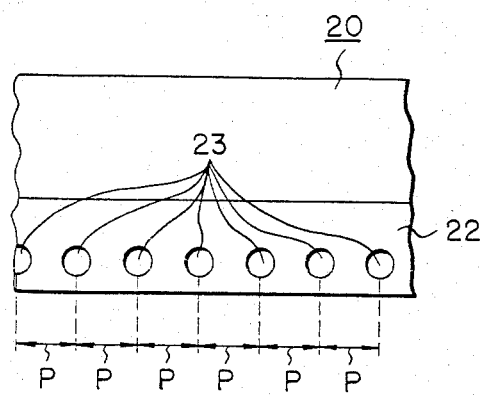
FIG. 3 is a diagram for explaining ink supply quantity control devices of an offset printing press.

Ink control devices, each having an ink key 23 and a stepper motor 24, are provided for the respective ink control zones of a printing plate. In other words, when ink keys 23 are disposed at an interval of P mm as indicated in FIG. 3, ink control zones are defined each of which has a width of P mm.

Figure 4:
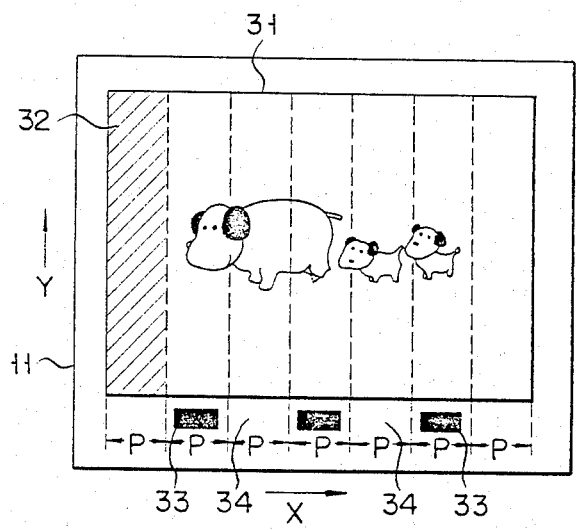
FIG. 4 is a plan view of a printing plate having plural inking control zones.

FIG. 4 shows a printing plate 11 which has an image region 31 to be printed. As described above, when a printing press has ink control devices at the interval of P mm, ink control zones 32 of width P mm are set as indicated. The quantities of ink supplied to the respective zones are adjusted in accordance with the image areas of the respective inking control zones.

Sizes of printing plates 11 range from 500 mm×500 mm to 1200 mm×1360 mm. The width P of the inking control zone differs with the type of printing press and ranges from 25 mm to 45 mm. The measurement of area data is made optically, after gumming the printing plate, by utilizing the difference in reflectivities of the image portion and the non-image portion. The image portion which is to be inked during the process of printing exhibits a reflectivity lower than that of the non-image portion which is not inked. For example, the reflectivity of image portion is about 1/5 that of the non-image portion with respect to He-Ne laser beam having a wavelength of 6328 angstroms.

In FIG. 4, reference numeral 33 denotes a region which corresponds to the image portion and is provided outside the image region 31, and reference numeral 34 denotes a region corresponding to the non-image portion. These regions are adapted to measure the intensities of reflected light from the image portion and the non-image portion during the measurement of area data. The measuring data ($I_B$ and $I_W$) are used as constants, as described later, in calculating the area of image portion at the printing machine.

Figure 5:
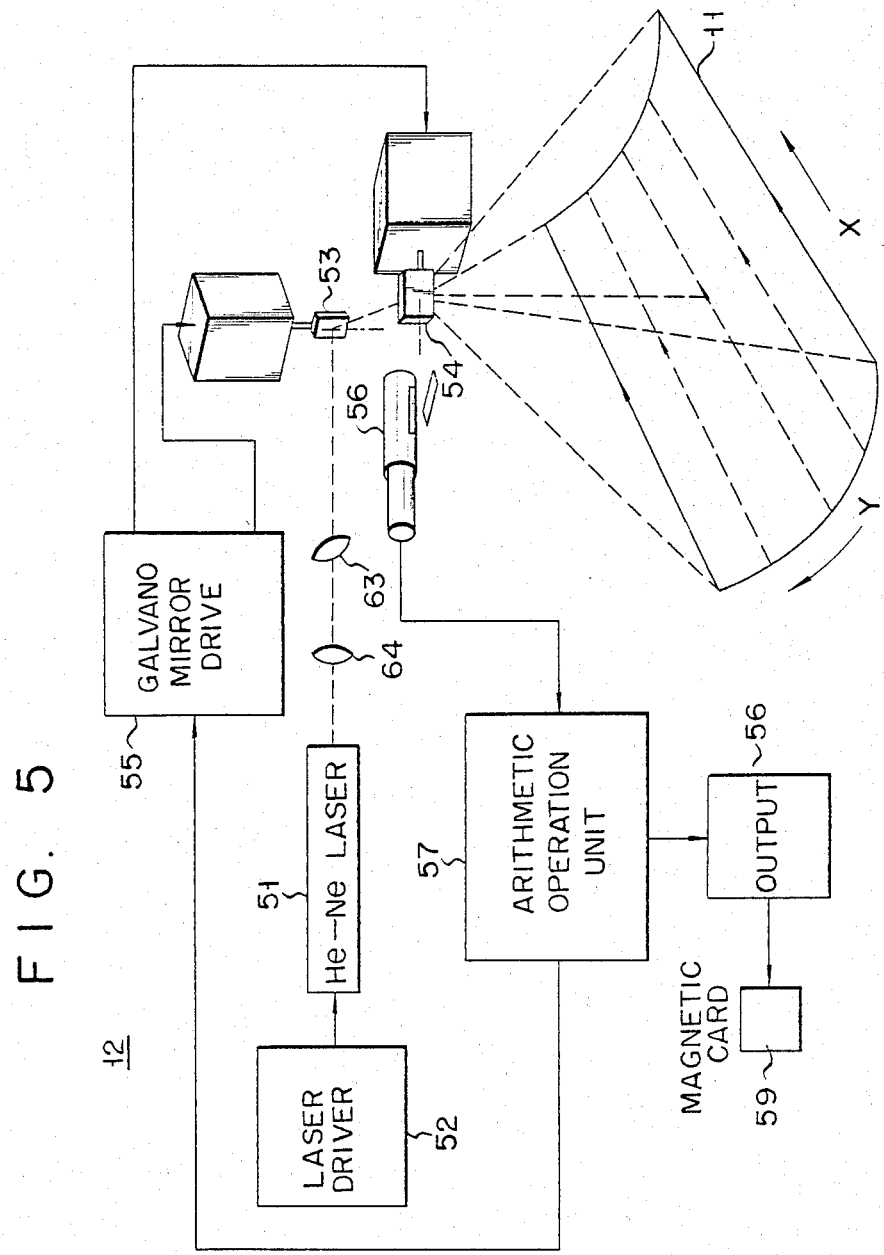
FIG. 5 schematically illustrates the area data measuring device in FIG. 1.

Referring to FIG. 5, the image area data measuring device is described below. There is installed an He-Ne laser 51 which is driven by a laser drive device 52 to emit a laser beam having a wavelength of 6328 angstroms. The laser beam emitted from laser 51 is deflected in the X axis direction and the Y axis direction of printing plate 11 by first and second galvano mirrors 53 and 54 which are controlled by a galvano mirror drive device 55 so that printing plate 11 is optically scanned. The reflected light from printing plate 11 is received by a photoelectric conversion device 56 which converts the reflected light into an electrical signal. An arithmetic operation unit 57 receives electrical signals from photoelectric conversion device 56 to obtain the area data in a form convenient for the subsequent calculation of the area or area factor of the image portion at a printing machine. The area data obtained by arithmetic operation unit 57 are recorded on a magnetic card 59 by an output device 58.

Two-dimensional scanning of printing plate 11 by the laser beam is performed such that the X axis scanning is performed by first galvano mirror 53 with the laser beam position on the Y axis fixed and the Y axis scanning or the shifting of the position on the Y axis is performed by second galvano mirror 54.

Figure 6:
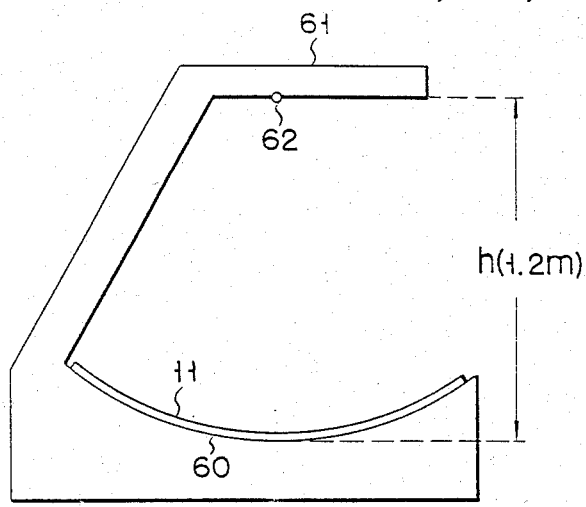
FIG. 6 shows a constructional relation of a curved mount for a printing plate and an optical system setting part of the area data measuring device.
Figure 7:
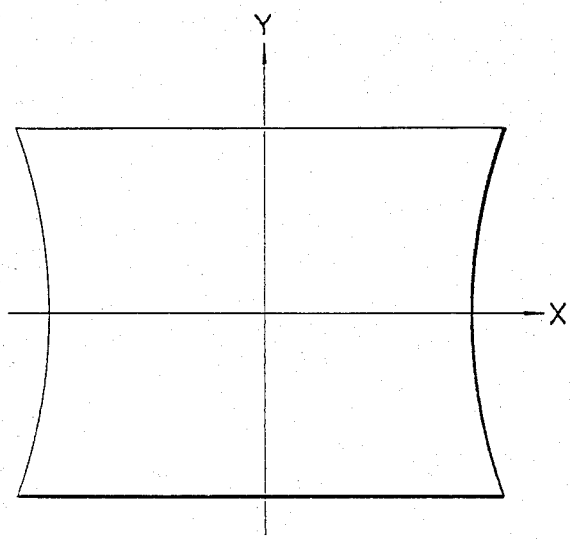
FIG. 7 is a diagram for explaining a two-dimensional scanning pin-cushion distortion occurring when the printing plate placed flat is optically scanned.

At a time of area data measurement, printing plate 11 is placed on the upper surface of a fixing mount 60 provided at the lower part of measuring device, the upper surface being formed to describe circular arc along the Y axis direction of the printing plate as indicated in FIG. 6. At the upper part of the measuring device an optical system setting section 61 is provided which irradiates the laser beam to printing plate 11. An outlet 62 of laser beam in optical system setting section 61, around which there are set first galvano mirror 53, second galvano mirror 54 and photoelectric conversion device 56, is located at the position on the central axis of printing plate 11 which coincides with the center of the circular arc of fixing mount 60. With this arrangement, the distance from laser beam outlet 62 to any point on a line along the Y axis of printing plate 11 becomes identical. Accordingly, a pin-cushion distortion, as illustrated in FIG. 7, (the width of scanning along the X axis becomes wider from the middle toward the outside) which occurs when a printing plate placed flat is scanned two-dimensionally, can be avoided.

Figure 8:
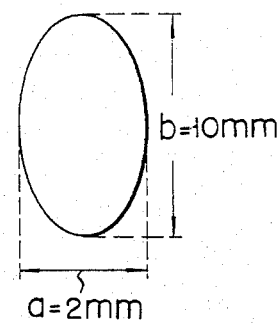
FIG. 8 shows a sectional view of a laser beam used in the optical scanning of the printing plate.

As illustrated in FIG. 4, inking control zones 32 of printing plate 11 each have a width of P mm in the X axis direction. As described before, the width P of ink control zones differs with the type of printing machine and ranges from 25 mm to 45 mm. Therefore, it is desirable to perform the data measurement for intervals of 1 mm in the X axis direction. On the other hand, concerning the Y axis direction, because the measured data are integrated along this direction, such a measuring accuracy as required in the X axis direction is not necessary. Accordingly, it is desired that, as shown in FIG. 8, the laser beam have a section of an ellipse which has the minor axis a along the X axis and the major axis b along the Y axis. The beam spot has a Gaussian distribution in its intensity. Therefore, in the preferred embodiment, to secure the measuring accuracy, $a=2$ mm and $b=10$ mm are set. In order to provide a laser beam of ellipse in section, as indicated in FIG. 5, in the lens system arranged between laser 51 and first galvano mirror 53, a convex lens 63 disposed on the side of first galvano mirror 53 is inclined against a convex lens 64 on the side of laser 51.

Referring to FIG. 9 which shows an arrangement of arithmetic operation unit 57 of FIG. 5, the method of measuring area data is described below.

An electrical signal from photoelectric converter 56 is amplified by an amplifier 71 and then converted into a digital signal by an analog-to-digital (A/D) converter 72. A digital signal from A/D converter 72 is transmitted to bus 75 through a latch circuit 73 and an interface 74. Connected to bus 75 are a central processor unit (CPU) 76, a read-only memory (ROM) 77 where information such as a program for executing area data measurement and data for shading correction are stored, a random access memory (RAM) 78, an output device 58 for recording measured data on a magnetic card, and a keyboard 79 for inputting data such as the size of a printing plate. A galvano mirror control device 55 receives a command from CPU 76 through bus 75 and interface 80 to drive first galvano mirror 53 and second galvano mirror 54.

Figure 10:
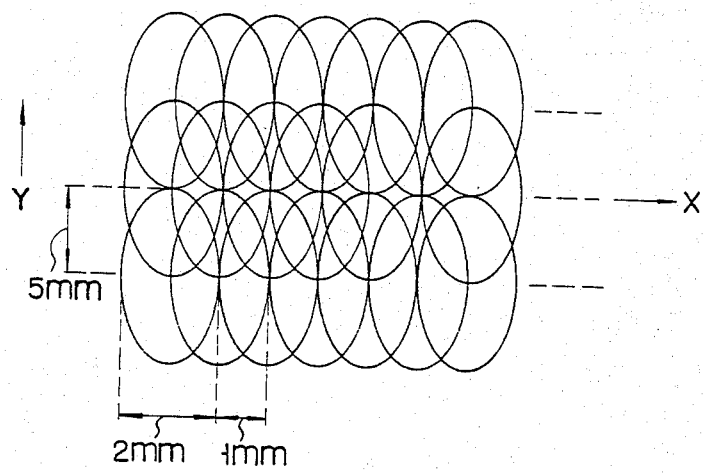
FIG. 10 shows an array of laser beam spots on a printing plate at the times of data sampling.

Before describing the operation of the area data measuring device of FIG. 9, the method of deflecting a laser beam by first galvano mirror 53 and second galvano mirror 54 will be described with reference to FIG. 10. A laser beam is continuously deflected by first galvano mirror 53 along an X axis scanning line from its starting point to its terminal point. When it reaches the terminal point, the beam is immediately returned to the starting point. Next, the laser beam is shifted by second galvano mirror 54 in the Y axis direction for a distance of 5 mm, which is half the major axis of the ellipse. Then, the beam is continuously deflected by first galvano mirror 53 along the next X axis scanning line. In the measuring area, the reflected light is measured each time the laser beam shifts 1 mm along the X axis direction. That is, in the X axis direction, data is sampled for intervals of 1 mm. In the Y axis direction, the sampled data are integrated (i.e. added). As illustrated in FIG. 10, measurement of the reflected light is made in a manner that the laser beam spots overlap. This is because the laser beam spot has a Gaussian distribution of intensity in both the X and Y axis directions. Otherwise, it is impossibble to perform uniform measurement over the whole region of the measuring area.

In the preferred embodiment, as the first and second galvano mirrors, the General Scanning Incorporated XY300 series are used, and as the galvano mirror control device the same company's AXY-150 two-channel drive amplifier is used.

The measurement of image areas, which is performed by a program stored in ROM 77, is described below.

When a command for starting the measurement of image area data is issued, the following steps are carried out sequentially.

Step 1:
When a command is issued to galvano mirror drive device 55 by CPU 76, first and second galvano mirrors 53 and 54 position a beam spot at a specific point (the origin) on the outside of the measuring region (which is larger than the image area region to be printed).

Step 2:
In this step, only first galvano mirror 53 is driven, thereby starring scanning in the X axis direction.

Step 3:
Measurement is delayed until the beam spot reaches the measuring region

Step 4:
A digital signal latched in latch circuit 73 is input to CPU 76 at intervals of a predetermined time and then stored in RAM 78. In this case, the interval corresponds to the time it takes the beam spot to move 1 mm in the X axis direction as shown in FIG. 10. If the length of the measuring region on a printing plate along the X axis is 1360 mm at maximum, 1360 data are obtained on a single X axis scanning line. 1360 data are stored by CPU 76 in RAM 78 at 1360 memory locations thereof having addresses 0 to 1359.

Step 5:
When the printing plate has, as illustrated in FIG. 4, marks 33 corresponding to the image portion and marks 34 corresponding to the non-image portion, which are used as references for calculation of the area factor, an arithmetic mean value $I_B$ (corresponding to the intensity of reflected light from the image portion of the printing plate) of data based on image portion marks 33 is obtained and then stored at a specific address of RAM 78. Similarly, an arithmetic mean value $I_W$ (corresponding to the quantity of reflected light from the non-image portion of the printing plate) of data based on non-image portion marks 34 is obtained and then stored at another specific address in RAM 78.

Step 6:
First galvano mirror 53 is returned to the initial state.

Step 7:
Second galvano mirror 54 is driven to move the beam spot along the Y axis by a certain distance (5 mm in this example). The distance of movement of the beam spot is memorized by CPU 76.

Step 8:
First galvano mirror 53 is driven to start the scanning along the X axis direction.

Step 9:
As in step 3, measurement is delayed until the beam spot reaches the measuring region.

Step 10:
Digital data latched in latch circuit 73 is input to CPU 76 at intervals of the predetermined time to be added to the data previously stored at the same addresses of RAM 78. In other words, the K-th sampled data on any scanning line along the X axis direction is stored at the (K−1) address of RAM 78.

Figure 11:
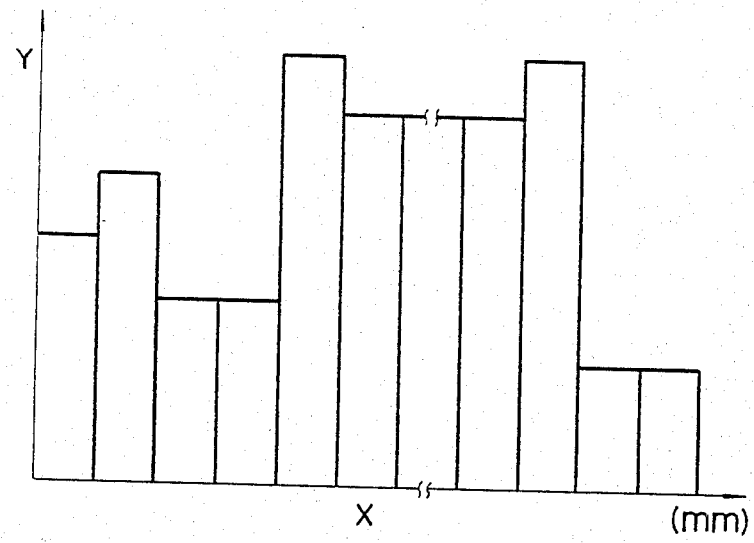
FIG. 11 is a diagram for explaining measured data accumulated in a RAM in FIG. 9.

Step 11:

A judgement is made by CPU 76 as to whether or not the distance of movement of the beam spot along the Y axis direction by second galvano mirror 54 has reached the maximum distance in the measuring region. If the answer is 'NO', the process returns to step 6, so that data acquisition is continued. As a result of such data acquisition, when the scanning of the measuring region is completed, the digital data representing the intensities of reflected light in the respective unit regions of 1 mm in width, as indicated by the bar graph in FIG. 11, are stored in the addresses 0 to 1359 of RAM 78. When scanning of the measuring area is completed, the operation proceeds to step 13.

Step 13:

In this step, correction is made for the shading effect in the measured data. From the standpoint of the light receiving element in the measuring device, even if the reflectivity is identical at any point along the X axis scanning line, the intensity of reflected light received by the light receiving element are not uniform along the scanning line. In this case, the intensity of reflected light is maximum at the middle of the X axis scanning line and decreases gradually toward the periphery. For the purpose of highly accurate measurement, it is necessary to make a correction for the fluctuation in intensity of reflected light received by the light receiving element due to the position of reflection. The distribution of intensity of reflected light along the scanning line can be known in advance. Therefore, it is possible to store in ROM 77 shading effect correction coefficients which are complementary to the distribution of intensity of reflected light.

In step 13, correction coefficients are thus read out sequentially from ROM 77, and in CPU 76 the corresponding data read out of RAM 78 is multiplied by this correction coefficient. In this manner, the measured data stored in RAM 78 are corrected.

Step 14:

The shading corrected data stored in RAM 78 and the reference reflected light data $I_B$ and $I_W$ for the image portion and the non-image portion are sent to output device 58 to be recorded on a magnetic tape. In this way, the measurement of area data is completed. The magnetic tape on which the measured data are recorded is then attached with an adhesive tape to a measured printing plate. The printing plate is then stored in the container.

Figure 12:
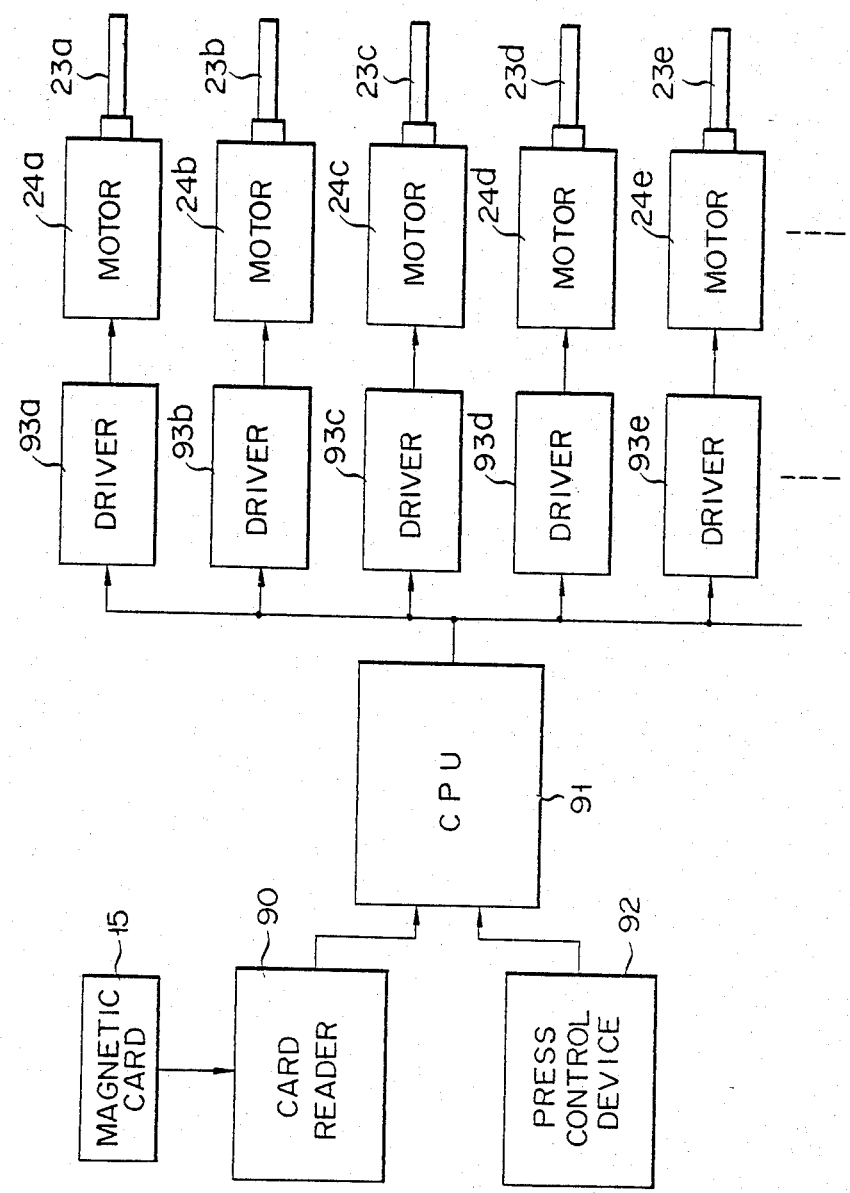
FIG. 12 is a block diagram of an ink supply quantity control device of a printing machine.
Figure 13:
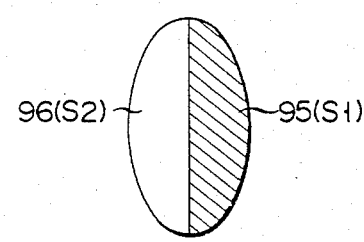
FIG. 13 is a diagram for explaining the calculation of an image area factor in a single laser beam spot.

For printing, the printing plate is attached to a plate cylinder of a printing machine. A magnetic card is loaded into a card reader 90 of a motor control device of the printing machine as shown in FIG. 12. The measured data are thus read out and input to CPU 91. A printing machine control device 92 is provided which inputs to CPU 91 data of the width P of the ink control zones of the printing machine, the printing speed, and the quality of the ink to be used (color and density).

When the area of image portion, printing speed and ink quality are determined, the quantity of ink consumption can be known empirically. CPU 91 calculates image areas of the respective ink control zones of the printing plate from the data read out of magnetic card 15. Then, taking into consideration the printing speed and the quality of ink which are common to the ink control zones, CPU 91 drives the stepper motors 24a to 24e through motor drive circuits 93a to 93e. Stepper motors 24a to 24e are provided for the ink control zones of the printing plate, respectively, and receive from CPU 91 drive pulses the numbers of which correspond to the image areas of the respective ink control zones to adjust ink keys 23a to 23e so that the quantities of ink supplied to the respective ink control zones are controlled.

A description will now follow of the method of calculating the image area factor of the respective ink control zones from the data of reflected light for the respective unit regions of 1 mm width and the reference data $I_B$ and $I_W$ recorded on the magnetic card.

Assume that a laser beam is irradiated on a part of the printing plate having an area of S including image portion (low reflective portion) 95 and non-image portion (high reflective portion) 96, and the intensity of reflected light from the part is Ir. The area and reflectivity of image portion 95 are assumed to be $S_1$ and $R_1$, respectively. The area and reflectivity of non-image portion 96 are assumed to be $S_2$ and $R_2$, respectively. The intensity of reflected light is $I_W$, when all the irradiated area S is occupied by non-image portion. When all the area S is occupied by image portion, the intensity of reflected light is $I_B$. When the intensity of the laser beam is $I_0$ the following equations are derived.

$$I_B = R_1 \cdot S \cdot I_0 \quad (1)$$

$$I_W = R_2 \cdot S \cdot I_0 \quad (2)$$

$$S = S_1 + S_2 \quad (3)$$

The intensity Ir of reflected light is expressed by $$Ir = (R_1 S_1 + R_2 S_2) I_0 \quad (4)$$

Substituting $S_2 = S - S_1$ into equation (4) yields $$Ir = \{(R_1 - R_2)S_1 + R_2 S\} I_0 = (I_B - I_W)\frac{S_1}{S} + I_W \quad (5)$$

Rearranging eq. (5) yields.

$$\frac{S_1}{S} = \frac{Ir - I_W}{I_B - I_W} \quad (6)$$

Equation (6) represents an area factor of image portion for the area S of beam spot. What is required in the embodiment is the area factors of image portions of the respective ink control zones of width P mm as indicated in FIG. 4.

To calculate the image area factors of the respective ink control zones, the image area factor for a beam spot as represented by eq. (6) should be obtained over the whole region of the ink control zone. It may be considered that, in each ink control zone, beam spots are arrayed in the form as illustrated in FIG. 10. Assume that, with such an array as shown in FIG. 10, there are M (=P) beam spots in the X axis direction and N beam spots in the Y axis direction in each of the ink control zones 32 as illustrated in FIG. 4. And further, assume that the area factor of image portion of the J-th ink control zone from the left of the printing plate is $Z_j$; the intensity of reflected light from the beam spot positioned at X=m and Y=l in the j-th zone is Ilm; and the area factor of the image portion of the unit region at X=m is Km. Because the areas of beam spots in the Y axis direction are the same, the area factor of each unit region is expressed by $$Km = \frac{\sum_{l=1}^{N} S_1 lm}{\sum_{l=1}^{N} Slm} = \frac{\sum_{l=1}^{N} (I_W - Ilm)}{\sum_{l=1}^{N} (I_W - I_B)} \quad (7)$$

In equation (7), $I_W$ and $I_B$ are constants representing the intensities of reflected light from the non-image and image portions, respectively. Accordingly, equation (9) is rewritten as $$Km = \frac{NI_W - \sum_{l=1}^{N} Ilm}{N(I_W - I_B)} \quad (8)$$

$$\sum_{l=1}^{N} Ilm$$

is the sum of the quantities of reflected light from the m-th unit region in the X axis direction in the j-th ink control zone. This corresponds to the measured data stored at the (jM+m−1) address of RAM 78. $I_B$ and $I_W$, as described in connection with FIG. 4, are data which are measured for image portion 33 and non-image portion 34, respectively and stored at the specific addresses of RAM 78. By calculating the sum of area factors Km of the respective unit region in the j-th zone, the area factor Zj of image portion of j-th ink control zone is obtained.

$$Zj = \frac{\sum_{m=(j-1)M+1}^{jM} \sum_{l=1}^{N} S_1 lm}{\sum_{m=(j-1)M+1}^{jM} \sum_{l=1}^{N} Slm} = \quad (9)$$

$$\frac{\sum_{m=(j-1)M+1}^{jM} \left( NI_W - \sum_{l=1}^{N} Ilm \right)}{\sum_{m=(j-1)M+1}^{jM} \{N(I_W - I_B)\}} =$$

$$\frac{MNI_W - \sum_{m=(j-1)M+1}^{jM} \left( \sum_{l=1}^{N} Ilm \right)}{MN(I_W - I_B)}$$

The operation of CPU 91 of FIG. 12 is described. When a command for adjusting the ink quantities is issued, CPU 91 carries out the following steps.

Step 1:
CPU 91 reads out, through card reader 90 the data recorded on magnetic card 15 which include data $I_W$, $I_B$ of reflected light from the non-image portion and the image portion, corrected data of reflected light from the respective unit regions of 1 mm in width and data of the size of the printing plate.

Step 2:
CPU 91 reads out, from control device 92, the data of the width (P mm) of ink control zones of the printing press, the quality of the ink used, the printing speed, and the quality of printing paper.

Step 3:
The $$\sum_{l=1}^{N} Ilm$$

data for the respective unit regions of 1 mm width are added together in the respective ink control zones of P mm width to obtain the sum Xj.

Step 4:
The area factor of an image portion of the respective ink control zones Zj is calculated from the following equation.

$$Zj = \frac{MNI_W - Xj}{MN(I_W - I_B)}$$

where M=P and N is the number of overlapped beam spots in the Y axis direction on the printing plate.

Step 5
A judgement is made whether or not the calculation in step 4 was made for the respective ink control zones. If the answer is 'NO', the operation returns to step 3. If the answer is 'YES', the process proceeds to step 6.

Step 6:
According to the image area factor Zj calculated in step 4, the quantity of ink supply for the corresponding control zone is selected from a data table stored in ROM so that the number Pi of drive pulses for the corresponding ink key drive motor is determined.

Step 7:
The Pi drive pulses are applied to the ink key drive motor so that the motor rotates by a desired angle.

Step 8:
A judgement is made whether or not the operation in step 7 was performed for each of ink keys or ink control zones. If the answer is 'NO', the operation returns to step 6. If the answer is 'YES', the adjustment of all ink keys is completed and thus the operation of the printing press is started.

For the purpose of accurately measuring the area factor of an image portion, in the case where the reflectivity is uniform over the surface of an object to be measured, it is desirable that the intensity of light received by the photoelectric conversion element be nearly uniform over the entire length of the surface of the object in the X axis direction. In practice, however, this is not the case. The quantity of received light decreases gradually from the middle toward the periphery (shading effect). In this situation, in order to make the quantity of received light of the photoelectric conversion device nearly uniform along the X axis scanning line, the distance between the photoelectric conversion device and the object needs to be made about ten times the length (about 1 m) of the object along the X axis direction. In this case, the apparatus becomes large. It is thus not a practical solution to the problem.

Figure 14:
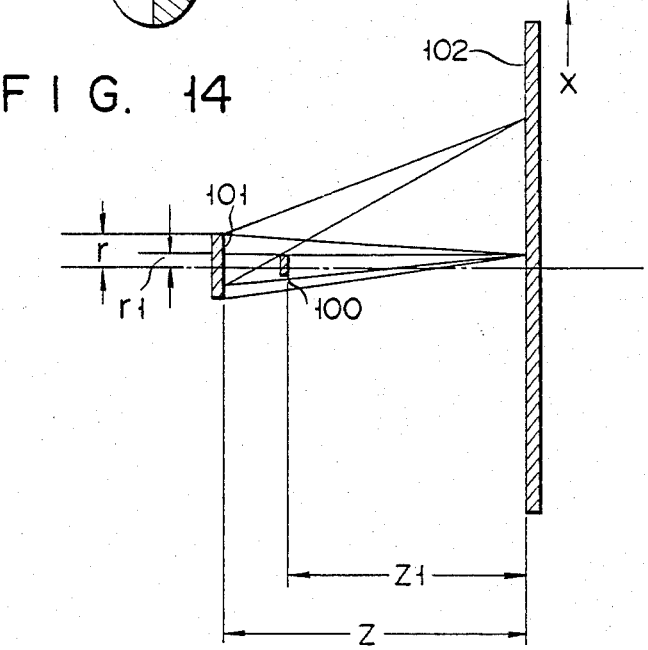
FIG. 14 illustrates a configuration in which a spatial filter or a douser is disposed between a light receiving element and an object to be measured to make uniform the distribution of received light at the light receiving element in the X axis direction of the printing plate.

The most practical solution for this problem was described previously. That is, the shading compensation data having a complementary characteristic to the distribution of received light quantity at the photoelectric conversion device may be stored in ROM 77 and the measured data stored in RAM 78 is then multiplied by the shading compensation data. In order to solve the problem of the shading effect, as illustrated in FIG. 14, a spatial filter or a douser 100 may be placed between the light receiving face 101 and the surface of the object to be measured 102 to partially intercept the reflected light from the object. Due to this configuration, the quantity of reflected light from the middle of the object 102 is suppressed. Consequently, although the quantity of light reaching the light receiving surface 101, as a whole, is reduced, but the distribution of received light quantity becomes almost uniform over a wider region. By varying the width $2r_1$ of spatial filter 100 and its position $Z_1$, the distribution of received light can be adjusted.

Figure 15:
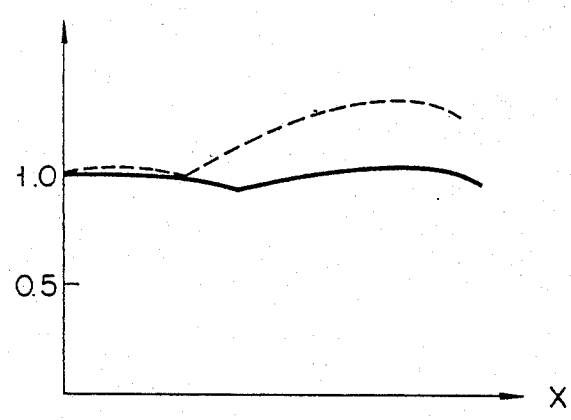
FIG. 15 shows the distributions of received light at the light receiving element obtained by the configuration in FIG. 14.

In the case of $Z=300$ mm, $r=11$ mm, $Z_1=280$ mm and $r_1=3.0$ mm, the distribution of received light quantity as shown by the solid line in FIG. 15 can be obtained by calculation. The distribution of received light quantity shown by the dotted line in FIG. 15 corresponds to the case of $Z=300$ mm, $r=11$ mm, $Z_1=200$ mm and $r_1=3.0$ mm. As seen, by changing the values of $r_1$ and $Z_1$, the distribution of received light quantity can be changed.

Figure 16:
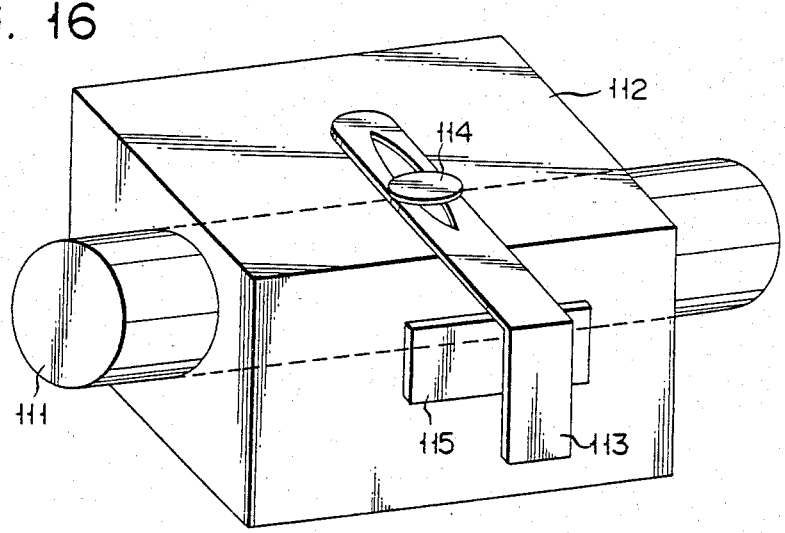
FIGS. 16 and 17 show a practical arrangement of a photoelectric conversion system using a douser.
Figure 17:
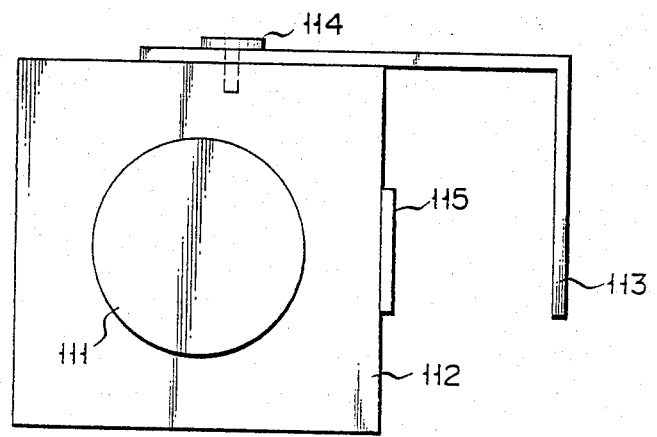

In an example of the photoelectric conversion device shown in FIGS. 16 and 17, an L-shaped douser 113 is set to a holder 112 holding a photomultiplier 111 in a positional relation opposite to the light receiving part of the photomultiplier by means of a screw 114 so as to adjust the distance from the light receiving part of the photomultiplier. Reference numeral 115 designates an optical filter for passing a light with a wavelength of 6328 angstroms. It is placed on a window of the holder 112 opposite the light receiving part of the photomultiplier. By adjusting the position of the douser 113 against the holder 112, the distribution of received light at the photoelectric conversion device can be adjusted.

Figure 18:
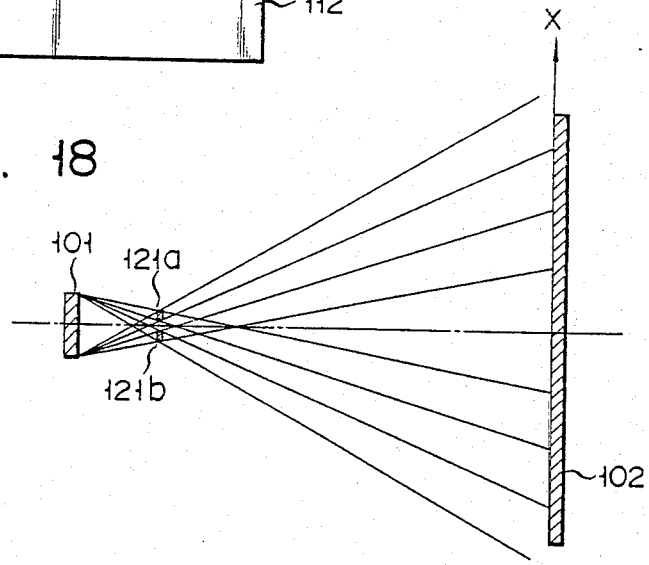
FIGS. 18 and 19 show modifications of douser.

As illustrated in FIG. 18, two dousers 121a and 121b may be placed along the X axis of the object 102. In this example, the received light quantity of the light receiving element 101 varies with the position of the object 102 in the X axis direction. That is, increase and decrease of the received light quantity are repeated along the X axis of the object, so that uniform light reception becomes possible over a wide region.

Figure 19:
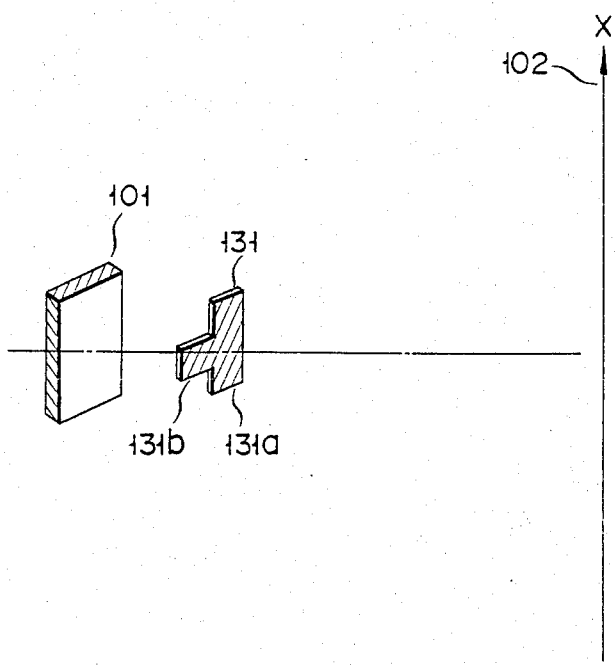
Figure 20:
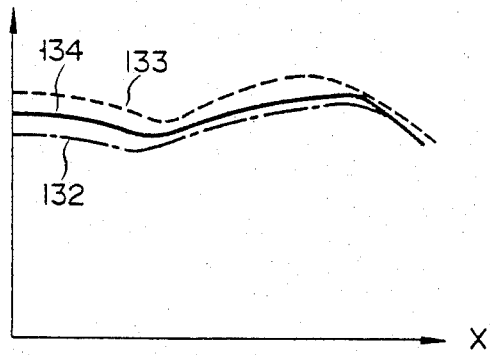
FIG. 20 shows the distribution of received light at the light receiving element obtained when a douser of FIG. 19 is used.

In the example of FIG. 19, a douser 131 has a wide part 131a and a narrow part 131b so that its width changes with the light reflecting position on the object. The distribution of received light by part 131a shown by a one-dot-chain line 132 in FIG. 20, and the distribution of received light by part 131b is shown by a broken line 133. The resultant distribution of light reception obtained when douser 131 is used is, as shown by the solid line 134, a combination of the distributions obtained by part 131a and part 131b.

Figure 21:
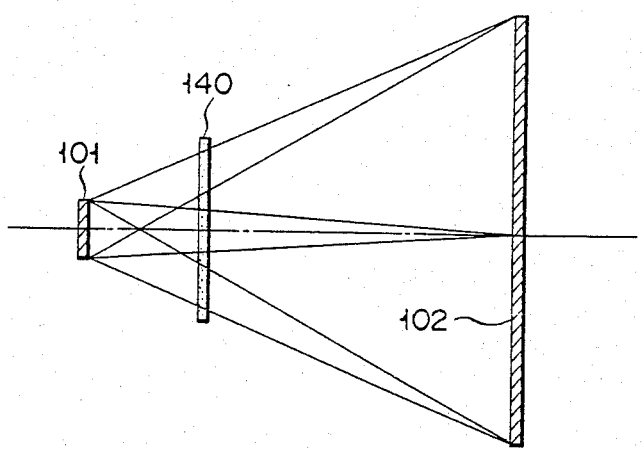

In the example of FIG. 21, an optical filter 140 having a density distribution in which the transmittance gradually increases from the middle toward the periphery is used as the douser. In this example, by adjusting the distribution of transmittance optimally, a uniform distribution of received light may be provided.

Figure 22:
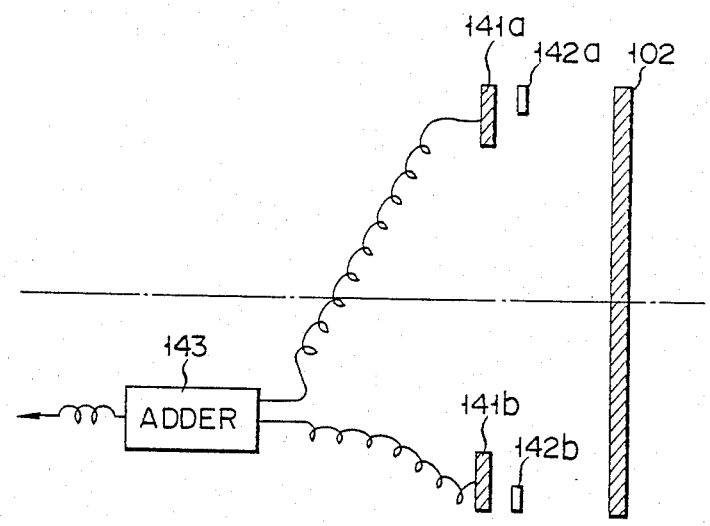

The example in FIG. 22 is suitable when the distance between a printing plate and a light receiving element is extremely small as compared with the size of the printing plate. Namely, two light receiving elements 141a and 141b and two dousers 142a and 142b are provided. The light receiving elements 141a and 141b are set, as shown, at the peripheral sides of the measured object 102. And dousers 142a and 142b are placed in a positional relationship as shown with respect to light receiving elements 141a and 141b. The outputs of light receiving elements 141a and 141b are combined at an adder 143.

In the example illustrated in FIG. 23, two dousers 145 and 146 are provided between a light receiving element 101 and the measured object 102. The distribution of received light quantity in this example is shown in FIG. 24.

FIGS. 25A and 25B show three-dimensional dousers. A uniform distribution of received light quantity similar to that in the case where many dousers are disposed is obtained.

In the example of FIG. 26, holes 151, 152 and 153 are made in a hollow douser formed as in FIG. 25A.

The dousers thus far descirbed are used to make the distribution of received light quantity along the X axis direction uniform. In the case where the shading correction by douser is not sufficient, the correction data according to the distribution of received light quantity at the photoelectric conversion device may be stored in ROM 77 when a douser is used. The measured data stored in RAM 78 are corrected in a manner already described.

So far, the shading correction using a douser has been described in the case of the X axis direction only. The shading correction by a douser is also possible for the Y axis direction. However, to obtain uniform distributions of received light in both the X and Y axis directions by using dousers is difficult.

FIG. 27 illustrates a preferred embodiment which makes a correction for the distribution of received light so as to be uniform in both the X and Y axis directions. On a rotary disk 162 rotated by a stepper motor 163 there are disposed galvano mirror 161 and photoelectric conversion device 56. In front of photoelectric conversion device 56 there is disposed a douser 164 to correct the shading effect with respect to the X axis direction as already described. Galvano mirror 161 is used to deflect a laser beam from laser 51 along the X axis direction on printing plate 11. The deflection of the laser beam along the Y axis direction is performed by the rotation of rotary disk 162. Because printing plate 11 is curved in the Y axis direction, the distribution of received light in the Y axis direction becomes uniform.

What we claim is:

1. Apparatus for measuring the area of an image portion and a non-image portion of an image-bearing member which have different reflectivities, said apparatus having a light source for emitting a light beam; scanning means for optically scanning said image-bearing member by deflecting said light beam from said light source along the X axis direction and the Y axis direction of said image-bearing member; a photoelectric converting unit for receiving light reflected from said image-bearing member and converting it to an electrical signal; and calculating means responsive to the electrical signal from said Photoelectric converting unit to calculate the area of one of the image portion and the non-image portion of said image-bearing member, wherein said scanning means comprises:

a scanning mirror for irradiating the light beam onto said image-bearing member;

a main scanner for rotating said scanning mirror to deflect the light beam along the X axis direction of said image-bearing member; and a subscanner for holding said scanning mirror and said photoelectric converson unit in close priority to each other thereon, said subscanner being disposed rotatably so that said scanning mirror deflects the light beam from said light source along the X axis direction and the Y axis direction of said image-bearing member.

2. Apparatus according to claim 1 wherein said subscanner comprises a disk on which said scanning mirror and said photoelectric conversion unit are disposed and motor means for rotating said disk.

3. Apparatus according to claim 1 wherein said image-bearing member is curved in one direction of the X and Y axis directions during the measurement.

4. Apparatus according to claim 1 wherein said light beam is a laser beam.

5. Apparatus according to claim 1 wherein said light beam irradiating said image-bearing member has a section of an ellipse.

* * * * *